United States Patent
Beesley et al.

(10) Patent No.: US 10,447,556 B2
(45) Date of Patent: Oct. 15, 2019

(54) END USER ON DEMAND NETWORK RESOURCE INSTANTIATION

(71) Applicant: FUJITSU LIMITED, Kawasaki-shi, Kanagawa OT (JP)

(72) Inventors: William Beesley, Murphy, TX (US); Robert Yates, Rowlett, TX (US); Melvin Tan, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 201 days.

(21) Appl. No.: 15/711,537

(22) Filed: Sep. 21, 2017

(65) Prior Publication Data
US 2019/0089601 A1    Mar. 21, 2019

(51) Int. Cl.
*H04L 12/24* (2006.01)
*H04L 12/26* (2006.01)

(52) U.S. Cl.
CPC ...... *H04L 41/5051* (2013.01); *H04L 41/5003* (2013.01); *H04L 41/5006* (2013.01); *H04L 41/5054* (2013.01); *H04L 41/5067* (2013.01); *H04L 43/065* (2013.01); *H04L 41/5019* (2013.01); *H04L 41/5029* (2013.01); *H04L 41/5096* (2013.01)

(58) Field of Classification Search
None
See application file for complete search history.

(56) References Cited

U.S. PATENT DOCUMENTS

| | | | |
|---|---|---|---|
| 2008/0106306 A1* | 5/2008 | Keady | H04L 25/02 327/100 |
| 2018/0124254 A1* | 5/2018 | Shaw | H04M 15/852 |

* cited by examiner

*Primary Examiner* — Brian Whipple
(74) *Attorney, Agent, or Firm* — Baker Botts L.L.P.

(57) ABSTRACT

End user on demand network resource instantiation in software-defined networks (SDN) may be provided by an SDN controller that receives an indication from a physical boost device operated by a network user. The boost device may indicate to the SDN controller that an improvement in network performance is desired by the network user. Once the indication is received, the SDN controller may implement network configuration changes for the improvement and cause the network user to be billed for the improvement.

16 Claims, 4 Drawing Sheets

500 — METHOD FOR NETWORK RESOURCE INSTANTIATION

502 PROVIDE NETWORK SERVICES TO A USER DEVICE OPERATED BY A USER, THE NETWORK SERVICES BEING PROVIDED THROUGH A SOFTWARE-DEFINED NETWORK (SDN) CONTROLLED BY AN SDN CONTROLLER, INCLUDING CONFIGURING THE SDN IN A FIRST CONFIGURATION STATE CORRESPONDING TO THE NETWORK SERVICES PROVIDED TO THE USER DEVICE

504 MONITOR THE NETWORK SERVICES USED BY THE USER DEVICE BY AN ANALYTICS ENGINE ACCESSIBLE TO THE SDN CONTROLLER, AND, BASED ON THE NETWORK SERVICES USED, GENERATE, BY THE ANALYTICS ENGINE, A SET OF NETWORK PROFILES CORRESPONDING TO CONFIGURATION STATES OF THE SDN

506 COMMUNICATE WITH THE SDN CONTROLLER BY A BOOST DEVICE ACCESSIBLE FOR OPERATION BY THE USER, WHERE THE BOOST DEVICE IS A PHYSICAL DEVICE DIFFERENT FROM THE USER DEVICE, AND THE BOOST DEVICE COMMUNICATES WITH THE SDN CONTROLLER WHEN OPERATED BY THE USER

508 RECEIVE, AT THE SDN CONTROLLER, AN INDICATION FROM THE BOOST DEVICE FOR A NETWORK PROVISIONING REQUEST FROM THE USER FOR THE USER DEVICE

510 SELECT A FIRST NETWORK PROFILE BASED ON THE NETWORK PROVISIONING REQUEST

512 CONFIGURE THE SDN, BY THE SDN CONTROLLER, IN A SECOND CONFIGURATION STATE CORRESPONDING TO THE FIRST NETWORK PROFILE

FIG. 5

END USER ON DEMAND NETWORK RESOURCE INSTANTIATION

BACKGROUND

Field of the Disclosure

The present disclosure relates to communication networks, and more specifically, to end user on demand network resource instantiation.

Description of the Related Art

As more applications are provided as networked services (referred to as "cloud applications") from data center infrastructure (referred to as "the cloud"), the cloud applications are executed on shared physical infrastructure and may be viewed as "tenants" in a multi-tenant cloud. For example, the cloud may represent distributed datacenter infrastructure that includes computing resources and intra-datacenter networks inside each datacenter, along with inter-datacenter optical networks connecting geographically dispersed datacenters. Virtualization of computing resources has emerged as a key technology for the cloud and may enable multiple tenants to efficiently share both computing and network resources. The standard abstraction architecture in virtualization of computing resources involves virtual machines (VMs) executing on a hypervisor. An abstraction may be a representation of an entity that is selected in terms of particular criteria or characteristics, while other characteristics irrelevant to the selection criteria are hidden or summarized. As used herein, a "virtualization" may represent an abstraction whose selection criterion is dedication of resources to a particular client or application.

Software-defined networking (SDN) represents an important step towards network virtualization and abstraction and may allow for a logical network entity to be instantiated automatically using software instructions, rather than manually from user input. In this manner, SDN may enable flexible definition of virtual networks. For example, SDN may enable a traffic flow entity to be instantiated using an arbitrary combination of layer identifiers defined in a header space, such as using various combinations of traffic identifiers (Internet-protocol (IP) addresses, media access controller (MAC) addresses, port addresses, etc.) at various layers to define a traffic flow. Then, by installing and configuring packet-forwarding rules associated with the traffic flow to physical switches, an SDN controller may ensure that the traffic flow entity instantiates a path that is routed through a network including the physical switches.

Although back-end network provisioning systems have automated various tasks using SDN, end user requests for network resource instantiation are typically associated with manual provisioning activity by a network operator.

SUMMARY

In one aspect a system for network resource instantiation is disclosed. The system may include a software-defined network (SDN) enabled to provide network services to a user device operated by a user. In the system, the SDN may be controlled by an SDN controller. The system may further include an analytics engine accessible to the SDN controller and enabled to monitor the network services used by the user device and, based on the network services used, generate a set of network profiles corresponding to configuration states of the SDN. The system may also include a boost device accessible for operation by the user, wherein the boost device is a physical device different from the user device, and wherein the boost device communicates with the SDN controller when operated by the user. In the system, the SDN controller may further include a memory media and a processor having access to the memory media. In the system, the memory media may store instructions executable by the processor for configuring the SDN in a first configuration state corresponding to the network services provided to the user device, receiving an indication from the boost device for a network provisioning request from the user for the user device, selecting a first network profile based on the network provisioning request, and configuring the SDN in a second configuration state corresponding to the first network profile.

In any of the disclosed implementations, the system may further include a business policy engine enabled to enforce business policies associated with the network services. In the system, the business policies may define terms of service between the user and a network provider offering the network services. In the system, the instructions for selecting the first network profile may further include instructions for receiving the first network profile from the analytics engine, comparing the first network profile to the business policies in effect for the user, and determining the second configuration state based on the first network profile and according to the business policies.

In any of the disclosed implementations, the system may further include a billing system enabled to bill the user for the network services used by the user device. In the system, based on the business policies, the instructions for configuring the SDN in the second configuration state may further include instructions for determining a financial charge to the user for the second configuration state, and applying the financial charge to an account associated with the user.

In any of the disclosed implementations of the system, each network profile in the set of network profiles may specify at least one of a latency associated with the network services, a bandwidth associated with the network services, a network priority of the network services, and a fault recovery policy associated with the network services.

In any of the disclosed implementations of the system, the network provisioning request may be for an improvement of the network services from the first configuration state to the second configuration state.

In any of the disclosed implementations of the system, the improvement in the second configuration state may include at least one of an increased bandwidth of the network services, a decreased latency of the network services, an alternate path for providing the network services, and an increased network priority of the network services.

In any of the disclosed implementations of the system, the network services may be associated with a gaming application executing on the user device.

In any of the disclosed implementations of the system, the network services may be associated with a media player application executing on the user device.

In yet another aspect, a disclosed method is for network resource instantiation. The method may include providing network services to a user device operated by a user, the network services being provided through a software-defined network (SDN) controlled by an SDN controller, including configuring the SDN in a first configuration state corresponding to the network services provided to the user device. The method may also include monitoring the network services used by the user device by an analytics engine accessible to the SDN controller, and, based on the network services used, generating, by the analytics engine, a set of network profiles corresponding to configuration states of the SDN. The method may still further include communicating with the SDN controller by a boost device accessible for operation by the user. In the method, the boost device may be a physical device different from the user device, while the boost device may communicate with the SDN controller when operated by the user. The method mat still further include receiving, at the SDN controller, an indication from the boost device for a network provisioning request from the user for the user device, selecting a first network profile based on the network provisioning request, and configuring the SDN, by the SDN controller, in a second configuration state corresponding to the first network profile.

In any of the disclosed implementations, the method may further include enforcing business policies associated with the network services using a business policy engine enabled to enforce the business policies. In the method, the business policies may define terms of service between the user and a network provider offering the network services. In the method, selecting the first network profile may further include receiving the first network profile from the analytics engine, comparing the first network profile to the business policies in effect for the user, and determining the second configuration state based on the first network profile and according to the business policies.

In any of the disclosed implementations, the method may further include billing the user for the network services used by the user device using a billing system enabled for billing the user. In the method, based on the business policies, configuring the SDN in the second configuration state may further include determining a financial charge to the user for the second configuration state, and applying the financial charge to an account associated with the user.

In any of the disclosed implementations of the method, each network profile in the set of network profiles may specify at least one of a latency associated with the network services, a bandwidth associated with the network services, a network priority of the network services, and a fault recovery policy associated with the network services.

In any of the disclosed implementations of the method, the network provisioning request may be for an improvement of the network services from the first configuration state to the second configuration state.

In any of the disclosed implementations of the method, the improvement in the second configuration state may include at least one of an increased bandwidth of the network services, a decreased latency of the network services, an alternate path for providing the network services, and an increased network priority of the network services.

In any of the disclosed implementations of the method, the network services may be associated with a gaming application executing on the user device.

In any of the disclosed implementations of the method, the network services may be associated with a media player application executing on the user device.

Other disclosed aspects include a network controller, an SDN controller, a server, and a network system for network resource instantiation, as described herein.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted, back-end network provisioning systems may enable automation of various tasks using SDN. However, end user requests for network resource instantiation are typically associated with manual provisioning activity by a network operator, and are not automatically handled by an SDN controller. For example, in a common usage scenario, an end user may desire for a temporary boost or improvement in network performance. The temporary boost may be to enable a user to perform a certain task associated with network traffic, such as playing a game or downloading or streaming multimedia content. In typical SDNs, such a reprovisioning of network services is handled manually by a network operator or by a user of the SDN, typically using a user interface that provides certain fixed capabilities. Also, such reprovisioning is typically instantiated as a fixed change to the network services, which may not correspond to user preferences for a limited time improvement.

As will be described in further detail herein, end user on demand network resource instantiation is disclosed for SDNs. The end user on demand network resource instantiation disclosed herein may enable an end user to modify network services using a boost device that is a physical device that directly interfaces with an SDN controller and enables immediate change to the network configuration. The end user on demand network resource instantiation disclosed herein may enable precise and targeted improvements in network services provided by SDNs, thereby improving profitability of existing network capacity. The end user on demand network resource instantiation disclosed herein may enable the user to have a tactile and immediate way to improve network performance.

Figure 1:
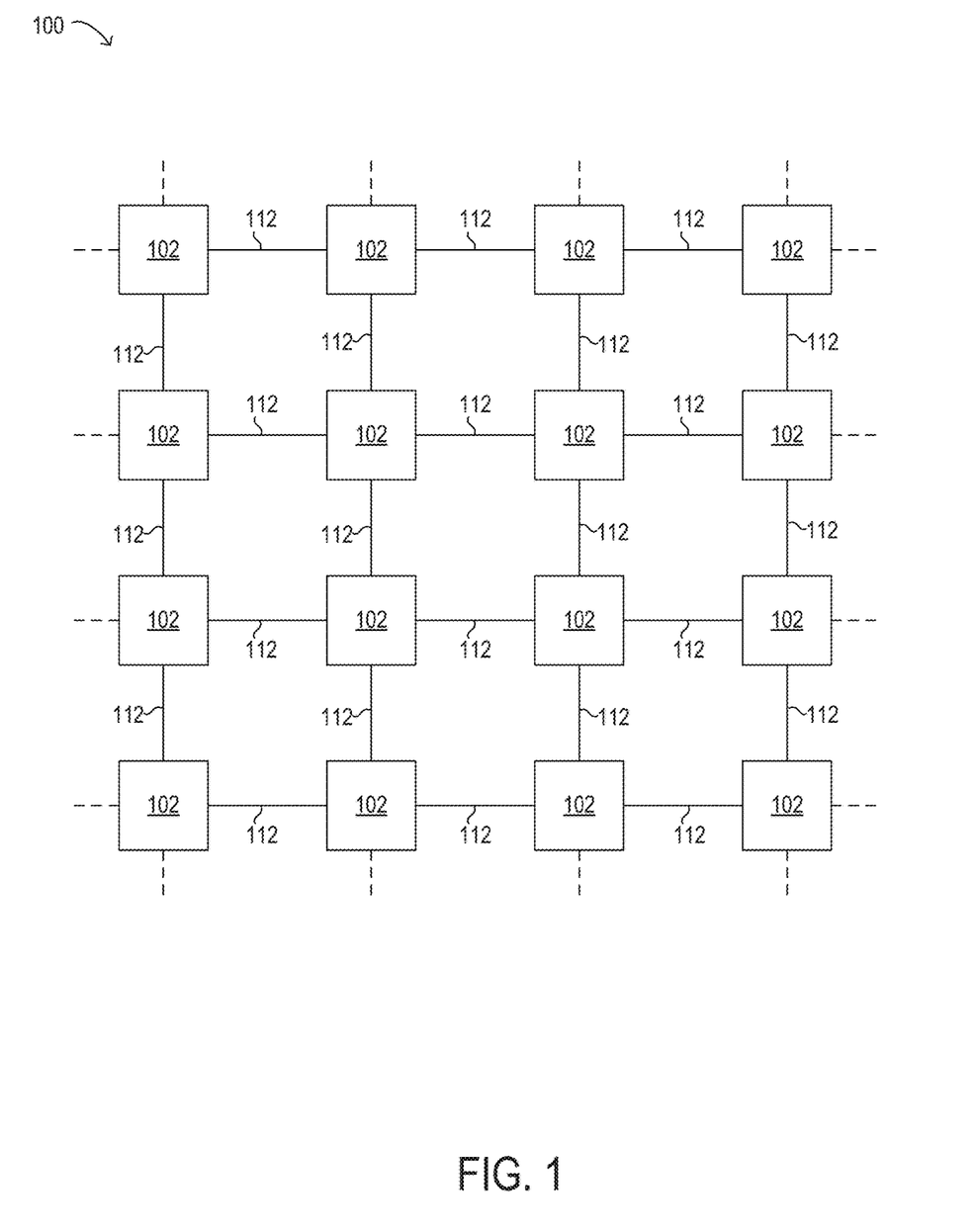
FIG. 1 is a block diagram of selected elements of an embodiment of a network.

Turning now to the drawings, FIG. 1 is a block diagram showing selected elements of an embodiment of network 100. In certain embodiments, network 100 may be an SDN. Network 100 may include one or more transmission media 112 operable to transport one or more signals communicated by components of network 100. The components of network 100, coupled together by transmission media 112, may include a plurality of network elements 102. In the illustrated network 100, each network element 102 is coupled to four other nodes. However, any suitable configuration of any suitable number of network elements 102 may create network 10. Although network 100 is shown as a mesh network, network 100 may also be configured as a ring network, a point-to-point network, or any other suitable network or combination of networks. Network 10 may be used in a short-haul metropolitan network, a long-haul inter-city network, or any other suitable network or combination of networks.

Each transmission medium 112 may include any system, device, or apparatus configured to communicatively couple network devices 102 to each other and communicate information between corresponding network devices 102. For example, a transmission medium 112 may include an optical fiber, an Ethernet cable, a T1 cable, a WiFi signal, a Bluetooth signal, or other suitable medium.

Network 100 may communicate information or "traffic" over transmission media 112. As used herein, "traffic" means information transmitted, stored, or sorted in network 100. Such traffic may comprise optical or electrical signals configured to encode audio, video, textual, and any other suitable data. The data may also be transmitted in a synchronous or asynchronous manner, and may transmitted deterministically (also referred to as 'real-time') or stochastically. In particular embodiments, traffic may be communicated via a suitable communications protocol, including, without limitation, the Internet Protocol (IP). Additionally, the traffic communicated via network 100 may be structured in any appropriate manner including, but not limited to, being structured in frames, packets, or an unstructured bit stream.

Each network element 102 in network 100 may comprise any suitable system operable to transmit and receive traffic. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, network 100 may represent an SDN that is managed by an SDN controller. Network 100 may provide network services to an end user for on demand network resource instantiation, as disclosed herein.

Figure 2:
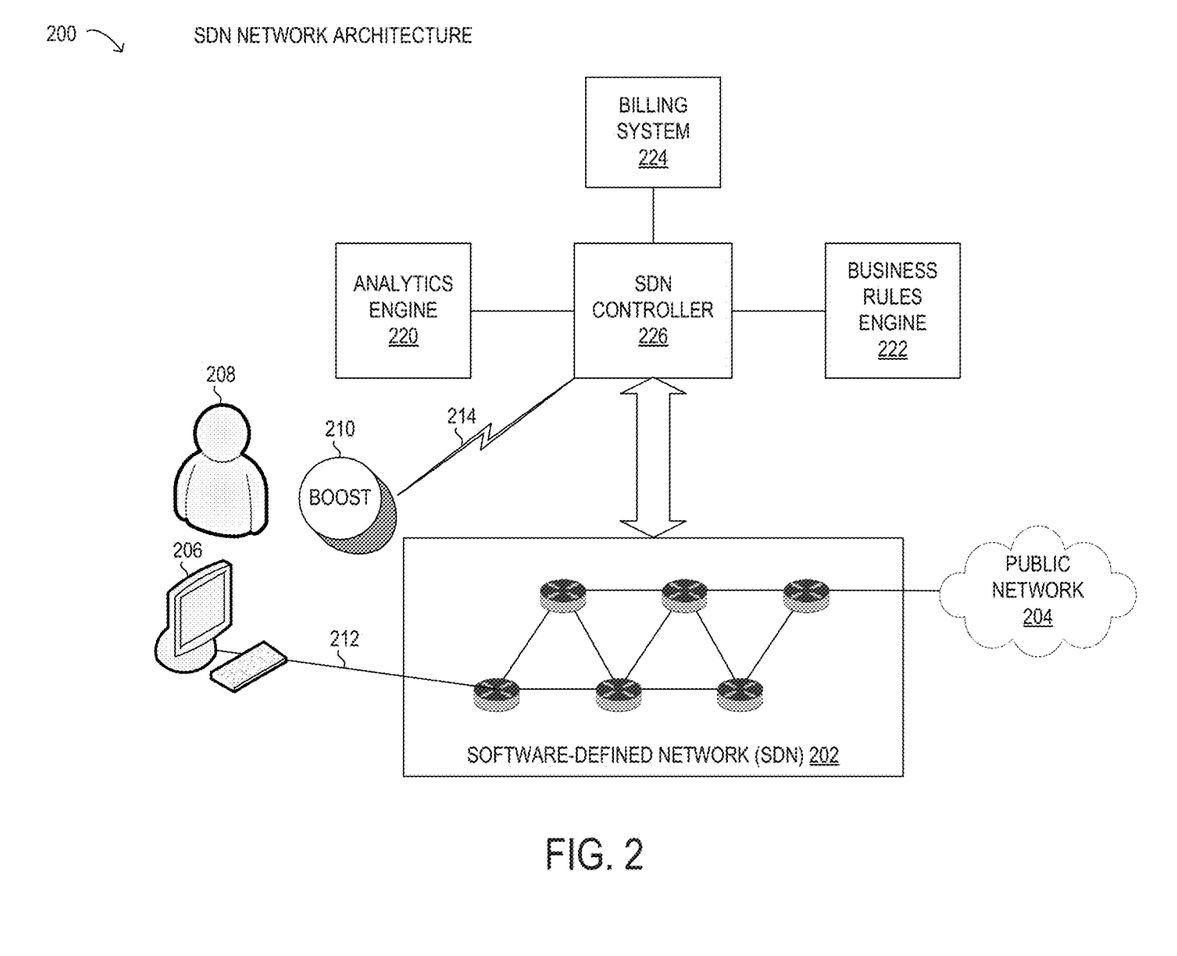
FIG. 2 is a block diagram of selected elements of an embodiment of an SDN network architecture.

Turning now to FIG. 2, a block diagram of selected elements on an embodiment of an SDN architecture 200 are shown. SDN architecture 200 is schematically illustrated and is not drawn to scale or perspective. It is noted that in different embodiments, SDN architecture may include fewer or more elements than shown in FIG. 3.

Figure 3:
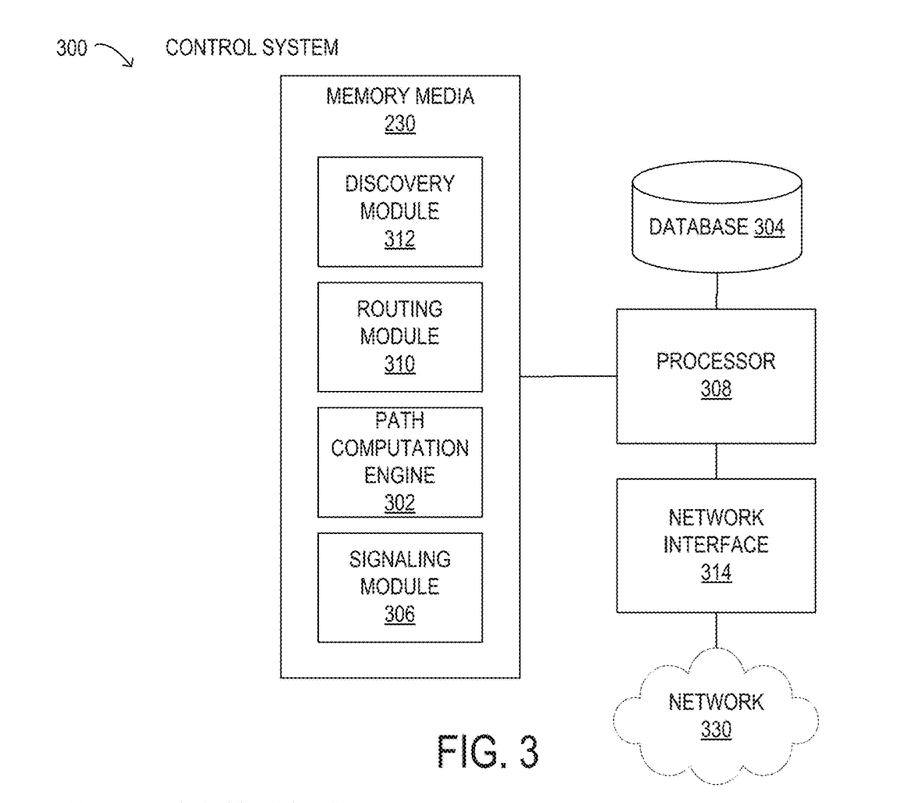
FIG. 3 is a block diagram of selected elements of an embodiment of a control system for network administration.

In FIG. 3, SDN architecture 200 includes an SDN 202. In various embodiments, SDN 202 may represent at least certain portions of network 100 (see FIG. 1). SDN 202 may be enabled to provide various network services, such as access to public network 204, which may include the Internet. SDN 202 is shown comprised of a plurality of routing devices representing any general network architecture, rather than any particular implementation. The routing devices in SDN 202 may be controlled by an SDN controller 226 enabled to perform various SDN control functions. For example, SDN controller 226 may support requests or demands for network services by configuring SDN 202 (or a portion thereof) for bandwidth, packet or flow prioritization, route selection, latency.

As shown, SDN 202 may provide a network link 212 to a user device 206, which may represent any of a variety of desktop, laptop, notebook, or handheld computing devices, among others. Typically, user device 206 will include a processor and memory media storing instructions executable by the processor to perform various computing tasks. A user 208 may operate user device 206 at a particular location, for example, where network link 212 is provided. In some embodiments, at least certain portions of network link 212 may be a wireless link. Also accessible to user 208 is boost device 210, which represents a physical device, such as a boost button device, that may also include functionality to connect to SDN controller 226 using a network link 214, which is typically a wireless network link. For example, boost device 210 may be equipped with a wireless network transceiver that may join a local wireless network (not shown) at the user premises where user device 206 is located. Boost device 210 may be preconfigured or configured to connect to SDN controller 226 when a boost button included in boost device 210 is activated by user 208. In this manner, boost device 210 may be used for end user on demand network resource instantiation, as will be described in further detail.

Also shown in SDN architecture 200 are an analytics engine 220, a billing system 224, and a business rules engine 222, which may represent functionality provided by back-end network systems by a provider of SDN 202. Analytics engine 220 may monitor user activity on user device 206, in particular with regard to usage of network services provided by SDN 202. Analytics engine 220 may monitor end user use of applications (or apps) executing on user device 206 and may infer user intent while user 208 is using SDN network 202. User intent may be determined by usage of applications on user device 206, which may be recorded and organized as timestamped events that can be further analyzed. For example, it may be determined that a user regularly checks email at a certain time of day by determining a plurality of timestamped events corresponding to email access. Similar other timestamped events may be used to infer various other user intentions, such as based on application type, usage duration, other software components used during application usage, or various combinations thereof and other factors. Furthermore, user intent may be inferred down to lower network stack layers, such as the protocol layer where usage of certain protocols can be detected and inferred (e.g. improvement of simple mail transfer protocol (SMTP) when email is used). In this manner, operation of boost device 210 may be correlated to recorded timestamped events for the user to infer present application intent, such as increased network bandwidth, or a lower latency network path. Analytics engine 220 may be accessible to SDN controller 202 and may generate a set of network profiles based on the network services used at user device 206. The network profiles may include different configuration states of SDN 202 that define the configuration of a latency associated with the network services, a bandwidth associated with the network services, a network priority of the network services, or a fault recovery policy associated with the network services, among other network parameters. Business rules engine 222 may also be accessible to SDN controller 226 and may be enabled to enforce business policies associated with the network services. For example, the business policies may define terms of service between the user and the network provider offering the network services using SDN 202. The network profiles generated by analytics engine 220 may be compared with, or processed using the business policies in effect for the user. Specifically, analytics engine 220 may store information about past and current user behavior, which can be used to infer what the user desires to perform at a certain time or situation. For example, the user may be monitored checking an email account regularly at a certain time, such as 7 AM, which can be used to infer that activation of boost device 210 around 7 AM is for the purposes of improving email performance. Then, it can be determined that certain email protocols (post office protocol (POP), or SMTP) can be prioritized or a network path to an email server for the user can be boosted for improved bandwidth or latency, in order to improve the user's experience on user device 206. Certain business rules may be applied to manage such boost activity, such as a service provision that a certain increase in price or an additional cost has been agreed to by the user for improving email performance. On the provider side, the business rules may specify that the user is allowed to have improved performance as long as no other higher priority traffic is affected, or to apply a certain time-based surcharge for the duration that the user's performance is improved responsive to activating boost device 210.

Then, a configuration state for SDN network 202, or specifically, for a network path supporting network link 212, may be determined and may be implemented by SDN controller 226. Billing system 224 may be enabled to bill user 208 for the network services used at user device 206, including any charges for improvements or boosting of network performance, according to the business policies in effect for user 208. For example, based on the business policies, billing system 224 may determine a financial charge to the user and may apply the financial charge to an account associated with user 208. Although a single exemplary user 208 is shown in SDN architecture 200 for descriptive purposes, it will be understood that SDN 202, SDN controller 226, analytics engine 220, business rules engine 222, billing system 224, among other elements, may support large pluralities of different users, who may be individuals, groups, or larger entities.

In operation of SDN architecture 200 for end user on demand network resource instantiation, network services to user may be initially provisioned by SDN controller 226. The network services may be initially provided according to a service agreement that user 208 has accepted for the network service and that was conventionally provisioned using SDN controller 226. Then, when the network services are active and are used by user 208, analytics engine 220 may begin profiling network activity at user device 206, such as by user input and application activity and may generate corresponding network profiles that indicate latency, bandwidth, fault recovery needs. For example, present user activity may be compared to recorded historical user activity, in order to learn what adaptations or adjustments the user is likely to make, and thus, can be automatically anticipated or presented as a suggestion to the user for present application activity, such as playing a game or answering email, for which network performance may be automatically tailored to improve the performance or application experience. The network profiles can also be compared to the business policies in effect for user 208. In particular implementations, business rules engine 222 may perform such comparisons. For example, a request for resources is validated against established policies, which may define constraints such as high and low watermark bandwidth thresholds, time-of-day restrictions, monetary limits, service level classifications, prioritization. When no matching business policies are found, a defined default policy may be applied that allows a network operator and user 208 to provide input (such as with a dialog box) in order to allow or reject a given request related to boost device 210.

Based on the network profiles generated by analytics engine 220 and the business policies of business rules engine 222, a boost configuration state for SDN 202 may be determined. The boost configuration state may provide an on-demand improvement in network experience by allowing user 208 to utilize boost device 210 to selectively improve network service. Because boost device 210 communicates directly to SDN controller 226, when boost device 210 is activated or operated by user 208, boost device 210 may send a network demand notification to SDN controller 226. The network demand notification may be indicative of the boost configuration state, enabling SDN controller 226 to implement specific network configuration changes corresponding to the boost configuration state for the network service used by user 208. The specific network configuration changes may include, but are not limited to, increasing available bandwidth on a path, selecting an alternate path with decreased latency, or increasing prioritization of network traffic. Once the network configuration to SDN 202 has been modified by SDN controller 226, to implement the improvement, SDN controller 226 may determine, by communicating with business rules engine 222, which billing changes or addendums for billing based on the implemented improvement are indicated. Then, SDN controller 226 may notify billing system 224 of any billings for the improvement that are to be charged to an account associated with user 208, which billing system 208 may charge to user 208.

Turning now to FIG. 3 a block diagram of selected elements of an embodiment of control system 200 for implementing control plane functionality in networks, such as, for example, in network 100 (see FIG. 1), is illustrated. A control plane includes functionality for network intelligence and control and comprises applications that support the ability to establish network services, including applications or modules for discovery, routing, path computation, and signaling, as will be described in further detail. The control plane applications executed by control system 200 work together to automatically establish services within network 100, which may be at least in part an optical network. Discovery module 212 discovers local links connecting to neighbors. Routing module 210 broadcasts local link information to network nodes while populating database 204. When a request for service from network 100 is received, path computation engine 202 may be called to compute a network path using database 204. This network path may then be provided to signaling module 206 to establish the requested service.

As shown in FIG. 2, control system 200 includes processor 208 and memory media 220, which store executable instructions (i.e., executable code) executable by processor 208, which has access to memory media 220. Processor 208 may execute instructions that cause control system 200 to perform the functions and operations described herein. For the purposes of this disclosure, memory media 220 may include non-transitory computer-readable media that stores data and/or instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and/or flash memory; non-transitory media; and/or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210.

In certain embodiments, control system 200 may be configured to interface with a person (i.e., a user) and receive data about the signal transmission path. For example, control system 200 may also include or may be coupled to one or more input devices and output devices to facilitate receiving data about the signal transmission path from the user, and outputting results to the user. The one or more input and output devices (not shown) may include, but are not limited to, a keyboard, a mouse, a touchpad, a microphone, a display, a touchscreen display, an audio speaker, or the like. Alternately or additionally, control system 200 may be configured to receive data about the signal transmission path from a device such as another computing device or a network element (not shown in FIG. 2).

As shown in FIG. 2, in some embodiments, discovery module 212 may be configured to receive data concerning a signal transmission path in a network and may be responsible for discovery of neighbors and links between neighbors. In other words, discovery module 212 may send discovery messages according to a discovery protocol, and may receive data about the signal transmission path. In some embodiments, discovery module 212 may determine features, such as, but not limited to, media type, media length, number and type of components, data rate, modulation format of the data, input power of an optical signal, number of optical signal carrying wavelengths (i.e., channels), channel spacing, traffic demand, or network topology, or any combination of the foregoing, among others.

As shown in FIG. 2, routing module 210 may be responsible for propagating link connectivity information to various nodes within a network, such as network 100. In particular embodiments, routing module 210 may populate database 204 with resource information to support traffic engineering, which may include link bandwidth availability. Accordingly, database 204 may be populated by routing module 210 with information usable to determine a network topology of a network.

Path computation engine 202 may be configured to use the information provided by routing module 210 to database 204 to determine transmission characteristics of the signal transmission path. The transmission characteristics of the signal transmission path may provide insight on how transmission degradation factors may affect the signal transmission path. When the network is an optical network, the transmission degradation factors may include, for example: chromatic dispersion (CD), nonlinear (NL) effects, polarization effects, such as polarization mode dispersion (PMD) and polarization dependent loss (PDL), amplified spontaneous emission (ASE) and/or others, which may affect optical signals within an optical signal transmission path. To determine the transmission characteristics of the signal transmission path, path computation engine 202 may consider the interplay between various transmission degradation factors. In various embodiments, path computation engine 202 may generate values for specific transmission degradation factors. Path computation engine 202 may further store data describing the signal transmission path in database 204.

In FIG. 2, signaling module 206 may provide functionality associated with setting up, modifying, and tearing down end-to-end networks services in network 100. For example, when an ingress node in the optical network receives a service request, control system 200 may employ signaling module 206 to request a network path from path computation engine 202 that may be optimized according to different criteria, such as bandwidth, cost, latency, among others. When the desired network path is identified, signaling module 206 may then communicate with respective nodes along the network path to establish the requested network services. In different embodiments, signaling module 206 may employ a signaling protocol to propagate subsequent communication to and from nodes along the network path.

Figure 4:
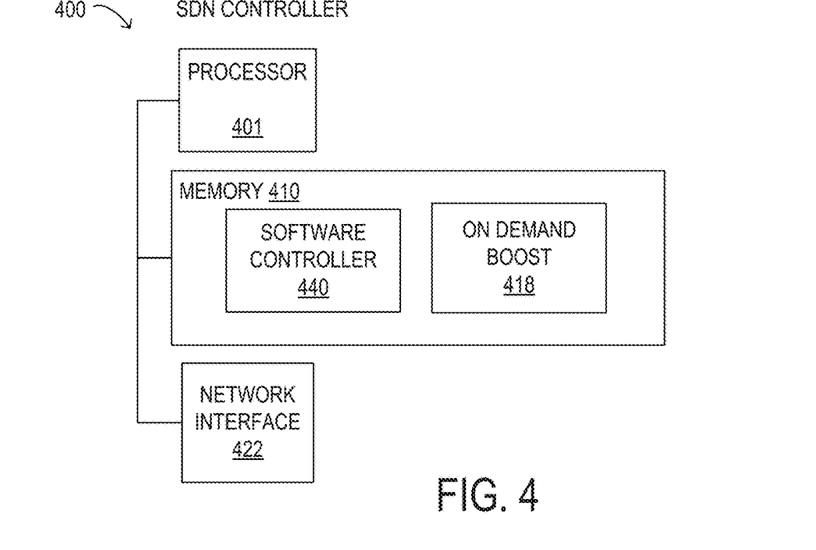
FIG. 4 is a block diagram of selected elements of an embodiment of a software-defined networking (SDN) controller.

Referring now to FIG. 4, a block diagram of selected elements of an embodiment of SDN controller 400 is illustrated. SDN controller 400 in FIG. 4 may be implemented to control SDN 202 (see FIG. 2) and is a schematic diagram for descriptive purposes. SDN controller 400 may represent an embodiment of SDN controller 226.

In FIG. 4, SDN controller 400 is represented as a computer system including physical and logical components for controlling SDN 202, as described herein, and may accordingly include processor 401, memory 410, and network interface 422. Processor 401 may represent one or more individual processing units and may execute program instructions, interpret data, process data stored by memory 410 or SDN controller 400. It is noted that SDN controller 400 may be implemented differently in different embodiments. For example, in some embodiments, SDN controller 400 may be implemented using a network node. In particular embodiments, memory 410 may store executable instructions in the form of a software controller 440 executing on processor 401. As shown, memory 410 may also store on demand boost 418, which may represent executable code stored in memory 410 to implement end user on demand network resource instantiation described herein.

In FIG. 4, memory 410 may be communicatively coupled to processor 401 and may comprise a system, device, or apparatus suitable to retain program instructions or data for a period of time (e.g., computer-readable media). Memory 410 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 410 may include different numbers of physical storage devices, in various embodiments. As shown in FIG. 4, memory 410 may include software controller 320, among other applications or programs available for execution.

Some non-limiting examples of external applications that may be used with SDN controller 400 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Francisco, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA;

Nuage Networks Virtualized Services Directory (VSD), Nokia Solutions and Networks Oy, Espoo, Finland).

Figure 5:
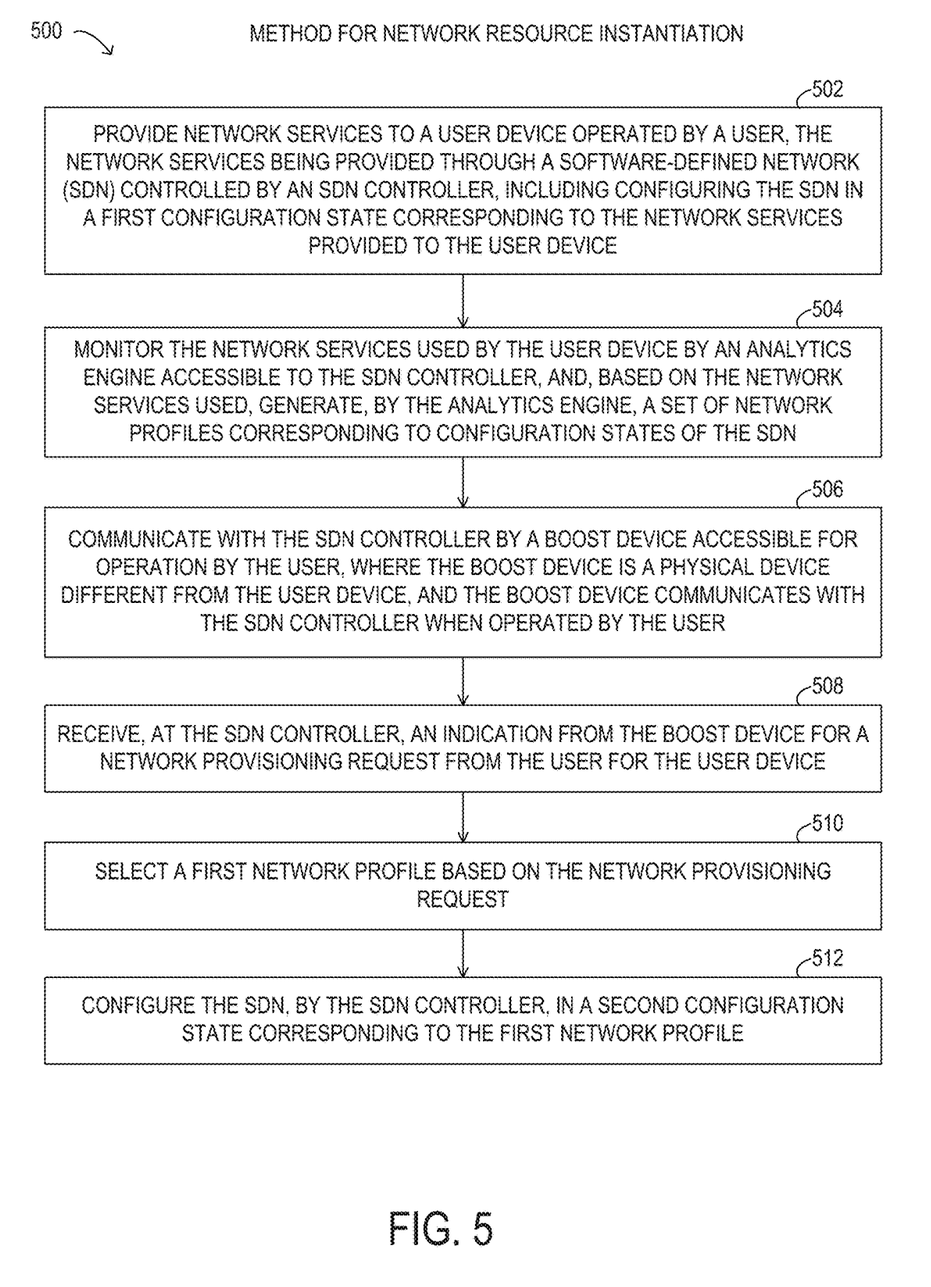
FIG. 5 is a flow chart of selected elements of an embodiment of a method for network resource instantiation.

Referring now to FIG. 5, a block diagram of selected elements of an embodiment of method 500 for end user on demand network resource instantiation, as described herein, is depicted in flowchart form. At least certain operations in method 500 may be performed using SDN architecture 200 (see FIG. 2), for example, by on demand boost 418 executing on SDN controller 226 or 400 (see also FIG. 4). It is noted that certain operations described in method 500 may be optional or may be rearranged in different embodiments.

Method 500 may begin at step 502 by providing network services to a user device operated by a user, the network services being provided through an SDN controlled by an SDN controller, including configuring the SDN in a first configuration state corresponding to the network services provided to the user device. At step 504, the network services used by the user device are monitored by an analytics engine accessible to the SDN controller, and, based on the network services used, a set of network profiles corresponding to configuration states of the SDN is generated by the analytics engine. At step 506, a boost device accessible for operation by the user communicates with the SDN controller, where the boost device is a physical device different from the user device, and the boost device communicates with the SDN controller when operated by the user. At step 508, an indication is received at the SDN controller from the boost device for a network provisioning request from the user for the user device. At step 510, a first network profile is selected based on the network provisioning request. At step 512, the SDN is configured by the SDN controller in a second configuration state corresponding to the first network profile.

As disclosed herein, end user on demand network resource instantiation in software-defined networks (SDN) may be provided by an SDN controller that receives an indication from a boost device operated by a network user. The boost device may indicate to the SDN controller that an improvement in network performance is desired by the network user. Once the indication is received, the SDN controller may implement network configuration changes for the improvement and cause the network user to be billed for the improvement.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for network resource instantiation, the system comprising:
    a software-defined network (SDN) enabled to provide network services to a user device operated by a user, wherein the SDN is controlled by an SDN controller;
    an analytics engine accessible to the SDN controller and enabled to monitor the network services used by the user device and, based on the network services used, generate a set of network profiles corresponding to configuration states of the SDN;
    a boost device accessible for operation by the user, wherein the boost device is a physical device different from the user device, and wherein the boost device communicates with the SDN controller when operated by the user; and
    the SDN controller further comprising a memory media and a processor having access to the memory media, wherein the memory media store instructions executable by the processor for:
        configuring the SDN in a first configuration state corresponding to the network services provided to the user device;
        receiving an indication from the boost device for a network provisioning request from the user for the user device;
        selecting a first network profile based on the network provisioning request; and
        configuring the SDN in a second configuration state corresponding to the first network profile.

2. The system of claim 1, further comprising:
    a business policy engine enabled to enforce business policies associated with the network services, wherein the business policies define terms of service between the user and a network provider offering the network services; and
    wherein the instructions for selecting the first network profile further comprise instructions for:
        receiving the first network profile from the analytics engine;
        comparing the first network profile to the business policies in effect for the user; and
        determining the second configuration state based on the first network profile and according to the business policies.

3. The system of claim 2, further comprising:
    a billing system enabled to bill the user for the network services used by the user device;
    wherein the instructions for configuring the SDN in the second configuration state further comprise instructions for:
        based on the business policies, determining a financial charge to the user for the second configuration state; and
        applying the financial charge to an account associated with the user.

4. The system of claim 1, wherein each network profile in the set of network profiles specifies at least one of:
    a latency associated with the network services;
    a bandwidth associated with the network services;
    a network priority of the network services; and
    a fault recovery policy associated with the network services.

5. The system of claim 1, wherein the network provisioning request is for an improvement of the network services from the first configuration state to the second configuration state.

6. The system of claim 5, wherein the improvement in the second configuration state comprises at least one of:
    an increased bandwidth of the network services;
    a decreased latency of the network services;
    an alternate path for providing the network services; and
    an increased network priority of the network services.

7. The system of claim 1, wherein the network services are associated with a gaming application executing on the user device.

8. The system of claim 1, wherein the network services are associated with a media player application executing on the user device.

9. A method for network resource instantiation, the method comprising:
- providing network services to a user device operated by a user, the network services being provided through a software-defined network (SDN) controlled by an SDN controller, including configuring the SDN in a first configuration state corresponding to the network services provided to the user device;
- monitoring the network services used by the user device by an analytics engine accessible to the SDN controller, and, based on the network services used, generating, by the analytics engine, a set of network profiles corresponding to configuration states of the SDN;
- communicating with the SDN controller by a boost device accessible for operation by the user, wherein the boost device is a physical device different from the user device, and wherein the boost device communicates with the SDN controller when operated by the user;
- receiving, at the SDN controller, an indication from the boost device for a network provisioning request from the user for the user device;
- selecting a first network profile based on the network provisioning request; and
- configuring the SDN, by the SDN controller, in a second configuration state corresponding to the first network profile.

10. The method of claim 9, further comprising:
- enforcing business policies associated with the network services using a business policy engine enabled to enforce the business policies, wherein the business policies define terms of service between the user and a network provider offering the network services; and
- wherein selecting the first network profile further comprises:
  - receiving the first network profile from the analytics engine;
  - comparing the first network profile to the business policies in effect for the user; and
  - determining the second configuration state based on the first network profile and according to the business policies.

11. The method of claim 10, further comprising:
- billing the user for the network services used by the user device using a billing system enabled for billing the user;
- wherein configuring the SDN in the second configuration state further comprises:
  - based on the business policies, determining a financial charge to the user for the second configuration state; and
  - applying the financial charge to an account associated with the user.

12. The method of claim 9, wherein each network profile in the set of network profiles specifies at least one of:
- a latency associated with the network services;
- a bandwidth associated with the network services;
- a network priority of the network services; and
- a fault recovery policy associated with the network services.

13. The method of claim 9, wherein the network provisioning request is for an improvement of the network services from the first configuration state to the second configuration state.

14. The method of claim 13, wherein the improvement in the second configuration state comprises at least one of:
- an increased bandwidth of the network services;
- a decreased latency of the network services;
- an alternate path for providing the network services; and
- an increased network priority of the network services.

15. The method of claim 9, wherein the network services are associated with a gaming application executing on the user device.

16. The method of claim 9, wherein the network services are associated with a media player application executing on the user device.

* * * * *